United States Patent [19]

Umezawa

[11] Patent Number: 5,314,216
[45] Date of Patent: May 24, 1994

[54] THIN RESIN TUBE CONNECTING COUPLING WITH FLANGED INSERT

[75] Inventor: Katsushi Umezawa, Numazu, Japan

[73] Assignee: Usui Kokusai Sangyo Kaisha Ltd., Japan

[21] Appl. No.: 7,326

[22] Filed: Jan. 21, 1993

[30] Foreign Application Priority Data

Jan. 22, 1992 [JP] Japan .................... 4-006600[U]

[51] Int. Cl.$^5$ ............................................. F16L 37/12
[52] U.S. Cl. .................................. 285/319; 285/921; 285/308
[58] Field of Search ............... 285/921, 319, 308, 341, 285/342, 255, 382.7, 339

[56] References Cited

U.S. PATENT DOCUMENTS

| | | | |
|---|---|---|---|
| 3,923,323 | 12/1975 | Brogan | 285/341 |
| 4,188,051 | 2/1980 | Burge | 285/342 |
| 4,427,219 | 1/1984 | Madej | 285/255 |
| 5,067,754 | 11/1991 | Bartholomew | 285/308 |
| 5,121,949 | 6/1992 | Reese | 285/255 |
| 5,161,833 | 11/1992 | McNaughton et al. | 285/319 |

*Primary Examiner*—Eric K. Nicholson
*Attorney, Agent, or Firm*—Anthony J. Casella; Gerald E. Hespos

[57] ABSTRACT

A coupling for a resin tube is provided with a body having opposed front and rear ends. The large diameter chamber extends into the rear end and a communication hole extends into the front end. A small diameter chamber connects the communication hole and the large diameter chamber. A seal is disposed in the small diameter chamber for sealing engagement with both the body and the resin tube to be coupled. A split annular grip with an inwardly directed annular pawl also is disposed in the small diameter chamber and is dimensioned for surrounding the tube. The outer circumference of the grip is tapered to define a minor diameter adjacent its rear end. A holding member has a front end with an internal taper engaged with the grip. The rear end of the holding member is releasably engaged with the rear end of the body. The tube can easily be inserted in a forward direction through the split annular grip for engagement by the seal. However, withdrawal forces cause the opposed tapers of the grip and the holding member to urge the annular pawl of the grip into tight engagement with the tube.

5 Claims, 3 Drawing Sheets

THIN RESIN TUBE CONNECTING COUPLING WITH FLANGED INSERT

BACKGROUND OF THE INVENTION

1. Field of the Invention

The present invention relates generally to an improvement in the structure of a coupling for connecting a resin tube having a relatively small diameter such as 20 mm or less and arranged as an oil or air supply conduit in an automobile or a variety of machines or apparatus.

2. Description of the Prior Art

A coupling in accordance with the prior art is shown in FIGS. 5a and 5b, and includes a cylindrical coupling body 11. The body 11 has a front end with a communication hole 12 extending axially therein. The body 11 further has a rear end with a stepped chamber extending therein and communicating with the hole 12. A disk-shaped grip 15 with pawl walls 15' extending inwardly is retained in the stepped chamber by a retainer 16. The rear end of the coupling body 11 is press-fitted inwardly to hold the retainer in the stepped chamber, and to thereby position the disk-shaped grip 15. Reference numeral 17 designates a release tool for engaging with the circumferential edge of the axial hole and moving back and forth to release the bite of a resin tube P' by the pawl wall 15'.

In this prior art, however, each pawl wall 15' has such a high rigidity that no bending occurs during fitting of the resin tube P', and the outer circumference of the resin tube P' is scratched in the axial direction. Since the fixed construction is positioned in front of the grip 15 and since the seal ring 14 is fitted in the seal groove 11', the gripping at the pawl wall 15' and the sealing effect at the seal ring 14 are deteriorated to invite a problem that a leakage is frequently induced for a long time.

SUMMARY OF THE INVENTION

The present invention has been conceived in view of the above-specified problem intrinsic to the prior art and has an object to provide a thin resin tube connecting coupling which can prevent any scratch on the outer circumference of the resin tube and the elastic seal member to ensure the gripping at the pawl wall thereby to prevent any drop in the sealing effect and which can confirm the fitting state of the seal member visually from the outside and replace the seal member easily, if necessary.

In order achieve the above-specified object, according to the present invention, there is provided a thin resin tube connecting coupling which comprises: a coupling body having a stepped smaller-diameter chamber enlarged radially in the axial inside from a communication hole, a larger-diameter chamber enlarged from the back of said smaller-diameter chamber, and a retaining wall protruding inward from the circumferential edge of the rear end of said larger-diameter chamber; an insert fitted in said coupling body and made cylindrical and having at its leading end a flanged wall to engage with the stepped portion of said smaller-diameter chamber; an elastic seal member and a sleeve member adapted to be fitted at the back of said flanged wall between the outer circumference of a resin tube to be fitted on the outer circumference of said insert and the inner circumference of said coupling body facing the outer circumference of said resin tube; a wedge-sectioned grip disposed at the back of said sleeve member and having an annular pawl wall protruding from the inner circumference thereof, a taper face formed on the outer circumference thereof and converging backward, and an axial slit formed in the circumferential wall thereof; and a holding member arranged at the back of said grip and having a plurality of tongue-shaped elastic arms retaining the retaining wall of said larger-diameter chamber and a groove, and a taper face formed on the inner circumference of the leading end thereof and converging backward, whereby a sealing effect is achieved by forcing said elastic seal member onto the outer circumference of the resin tube inserted.

Thanks to the construction of the present invention, the sealing effect is achieved at the elastic seal member by arranging the seal member, the sleeve member, the grip and the holding member in the smaller-diameter chamber a the coupling body and outside of the resin tube fitted on the outer circumference of the insert. If an extracting force is applied to the resin tube, the grip is moved backward together with the resin tube to bring the grip and the taper face of the holding member into engagement with each other to cause the pawl wall of the grip to bite the outer circumference of the resin tube. When the resin tube is to be fitted, the elastic arm of the holding member is pushed in the axial direction. At the releasing time when the retaining wall and the groove are disengaged, the outer circumference of the resin tube and the elastic member can be kept away from any scratch in the axial direction. As a result, the gripping of the pawl wall can be ensured to prevent any drop in the sealing effect of the seal member. The connecting state can be confirmed visually from the outside. At the same time, the resin tube, the seal member and so on can be easily replaced, if necessary.

BRIEF DESCRIPTION OF THE DRAWINGS

FIG. 2b is a central section taken from FIG. 2a;

DETAILED DESCRIPTION OF THE PREFERRED EMBODIMENTS

Figure 1A:
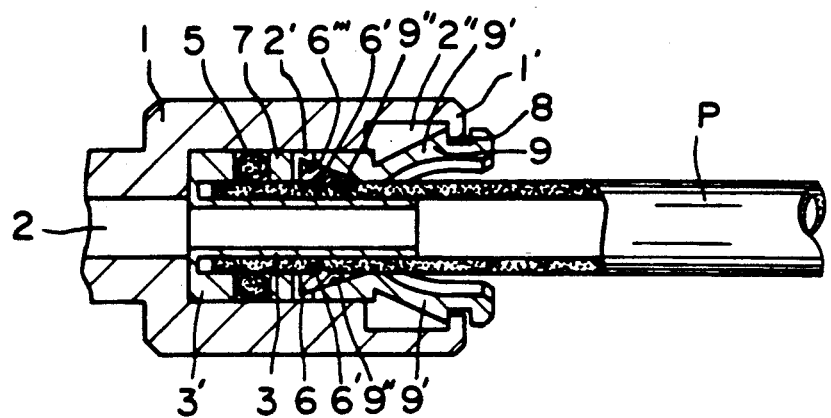
FIG. 1a is a longitudinal section showing a thin resin tube connecting coupling according to the present invention when it is connected.
Figure 1B:
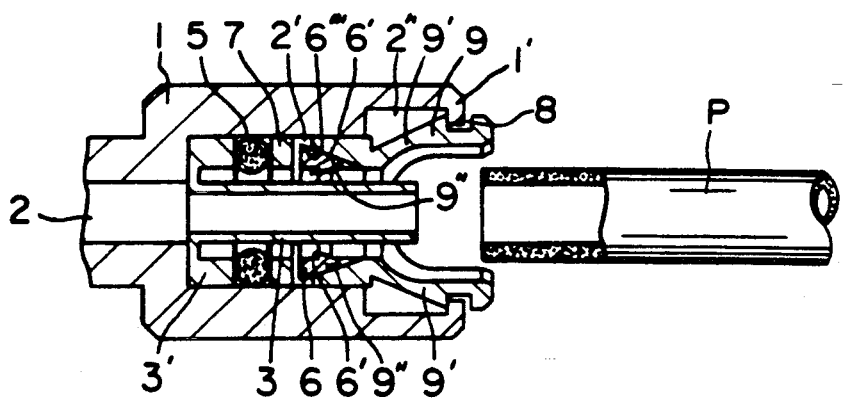
FIG. 1b is a section showing the state before the coupling of FIG. 1a is connected.
Figure 2A:
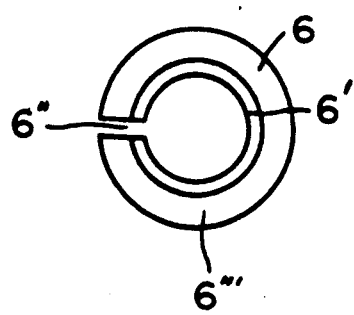
FIG. 2a is an enlarged front elevation showing a grip of the coupling of FIG. 1.
Figure 2B:
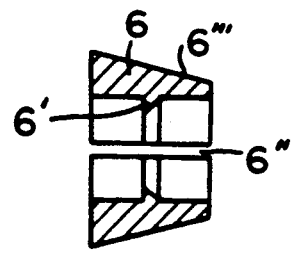

In FIGS. 1 to 4, a coupling body 1 has a stepped smaller-diameter chamber 2' enlarged radially in the axial inside from a communication hole 2, and a larger-diameter chamber 2'' enlarged from the back of the smaller-diameter chamber 2'. The coupling body 1 further has a retaining wall 1' protruding inward from the circumferential edge of the rear end of the larger-diameter chamber 2''. In the smaller-diameter chamber 2', there is inserted and fitted an insert 3 which is positioned in the coupling body 1 and made cylindrical and which has at its leading end a flanged wall 3' to engage with the stepped portion of the smaller-diameter chamber 2'. At the back of the flanged wall 3', there disposed fitted an elastic seal member 5 and a sleeve member 7 which are fitted between the outer circumference of the insert 3 and the inner circumference of the coupling body 1 facing the outer circumference of the insert 3. These elastic member 5 and the sleeve member 7 are given a diameter substantially equal to that of the flanged wall 3'. A wedge-shaped grip 6 is disposed at the back of the sleeve member 7 and has an annular pawl wall 6' protruding from the inner circumference thereof, a taper face 6''' formed on the outer circumference thereof and converging backward, and an axial slit 6'' formed in the circumferential wall thereof. A holding member 9 is arranged at the back of the sleeve member 7 and has a plurality of tongue-shaped elastic arms 9' retaining the retaining wall 1' of the larger-diameter chamber 2'' and a groove 8, and a taper face 9'' formed on the inner circumference of the leading end thereof and converging backward in a manner to correspond to the taper face 6''' of the grip 6. With this construction, when a resin tube P is fitted on the outer circumference of the insert 3, the elastic seal member 5 is forced onto the outer circumference of the resin tube P to establish the desired sealing effect. When an extracting force is applied to the resin tube P, the grip 6 is moved together with the resin tube P to bring the taper face 6''' of the grip 6 and the taper face 9'' of the holding member 9 into engagement with each other so that the pawl wall 6' is dislocated inward to bit the outer circumference of the resin tube P inserted.

Figure 3:
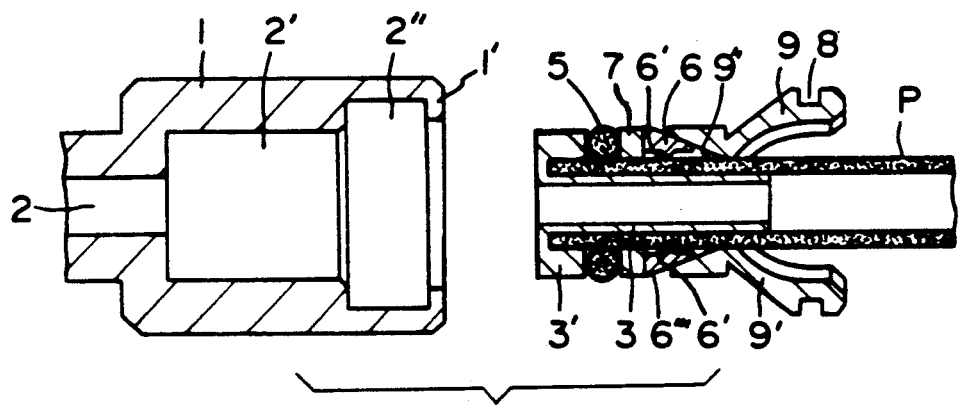
FIG. 3 is a section showing the state before a coupling according to another embodiment is connected.

Next, another embodiment is shown in FIG. 3. In this embodiment, the insert 3 is fitted in the resin tube P, and the elastic seal member 5, the sleeve member 7, the grip 6 and the holding member 9 are assembled in advance on the outer circumference of the resin tube P in the recited order from the flanged wall 3'. In this state, the assembly is fitted in the smaller-diameter chamber 2' such that the groove 8 of the elastic arm 9' of the holding member 9 is held and retained on the retaining wall 1' of the larger-diameter chamber 2''. Thus, the elastic seal member 5 is forced on the outer circumference of the resin tube P to establish the sealing effect.

On the other hand, the resin tube P can be easily removed by pushing the elastic arm 9' of the holding member 9 in the radially direction to release the engagement between the retaining wall 1' and the groove 8 and by extracting the resin tube P.

Figure 4:
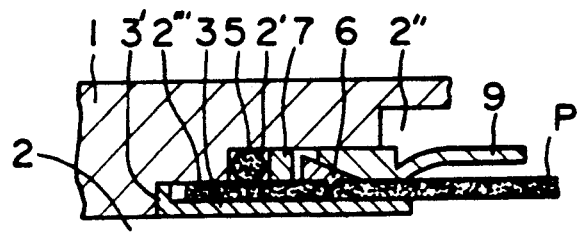
FIG. 4 is a section showing a portion of still another embodiment in an enlarged scale.
Figure 5A:
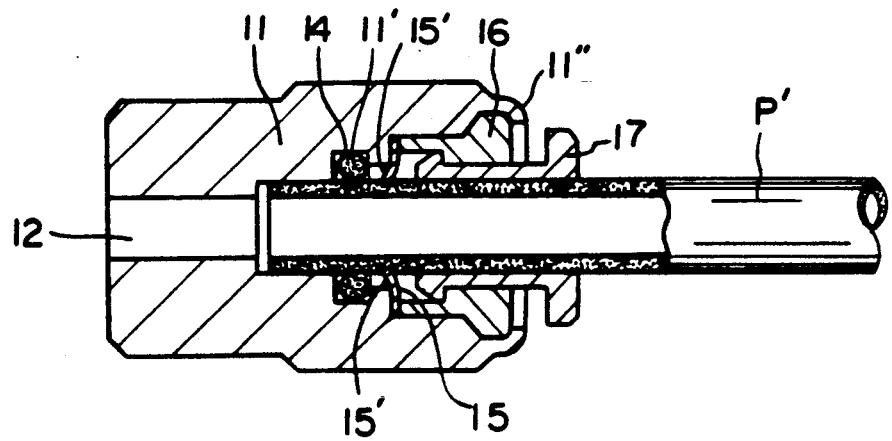
FIG. 5a is a longitudinal section showing the connecting coupling according to an example of the prior art when it is connected.
Figure 5B:
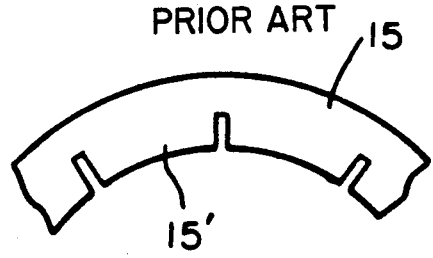
FIG. 5b is a front elevation showing a portion of the grip of FIG. 5a in an enlarged scale.

Incidentally, FIG. 4 shows still another embodiment. This embodiment is constructed such that another small-diameter chamber 2''' is formed between the communication hole 2 and the smaller-diameter chamber 2' and such that the outer circumference of the flanged wall 3' of the insert 3 is given a diameter substantially equal to that of the inner circumference of the smaller-diameter chamber 2''' and a face substantially coextensive with the outer circumference of the resin tube P.

As has been described hereinbefore, the thin resin tube connecting coupling according to the present invention is constructed such that the coupling body 1 is radially enlarged to form the inner circumference of the smaller-diameter chamber 2' and such that the holding member 9 holding the seal member 5, the sleeve member 7 and the grip 6 is arranged in the smaller-diameter chamber 2' and on the outer face of the resin tube P fitted on the outer circumference of the insert 3 having the flanged wall 3' at its leading end. Thus, the sealing effect is achieved by the elastic seal member 5 at the time of connection, and the fixed connection is achieved by causing the pawl wall 6' to bite the outer circumference of the resin tube P if an extracting force is applied. As a result, no scratch in the axial direction will be caused on the outer circumference of the resin tube P and the elastic seal member 5. Thus, the grip on the pawl wall 6' can be ensured to prevent any drop of the sealing effect at the seal member 5. The state of connection can be visually confirmed from the outside so that the seal member or the like can be easily replaced, if necessary. Thus, the present invention can provide a remarkably useful coupling for connecting a thin resin tube.

What is claimed is:

1. A coupling for connecting to a thin resin tube, said resin tube being generally cylindrical and having a connecting end, an inner circumferential surface defining an inside diameter, and an outer circumferential surface defining an outside diameter, said coupling comprising:

a body having opposed front and rear ends, a large diameter chamber extending axially forwardly into said rear end of said body, a radially inwardly extending retaining wall at said rear end of said body defining a reduced diameter entry to said large diameter chamber, a small diameter chamber extending axially forwardly from said large diameter chamber and a communication hole extending axially forwardly from said small diameter chamber to the front end of said body, said communication hole defining a diameter smaller than the small diameter chamber, such that a step is defined intermediate said small diameter chamber and said communication hole of said body;

an insert having a cylindrical portion with opposed front and rear ends and an outside diameter substantially equal to the inside diameter of said resin tube, a flange extending radially outwardly from said front end of said cylindrical portion and dimensioned for seating in said small diameter chamber and against said step;

an annular elastic seal disposed in said small diameter chamber rearwardly of the flange of said insert and dimensioned for sealing engagement between the outer circumferential surface of said tube and portions of said body defining said small diameter chamber;

an annular sleeve disposed in said small diameter chamber adjacent and rearwardly of said annular elastic seal and dimensioned for engagement around said tube;

an annular grip having opposed front and rear ends and an axial slit extending therethrough, said grip being disposed in said small diameter chamber substantially adjacent and rearwardly of said annular sleeve, said grip having a tapered outer circumferential surface defining a major diameter adjacent said front end of said grip and a minor diameter adjacent said rear end thereof, an annular pawl wall protruding inwardly on said annular grip for biting engagement with the resin tube; and a holding member having opposed front and rear ends, said front end defining an annular inwardly facing taper in sliding engagement with the tapered outer circumferential surface of the grip, the rear end of said holding member defining a plurality of deflectable tongue-shaped elastic arms releasably engaged with the inwardly extending retaining wall at the rear end of the body, whereby insertion of the connecting end of said resin tube over the cylindrical portion of the insert causes sealing engagement of the seal with the outer circumferential surface of the resin tube, and whereby rearwardly directed withdrawal forces exerted on said resin tube causes tight wedged engagement of said annular pawl wall of said grip with said resin tube to prevent withdrawal of said resin tube from said coupling.

2. A coupling as in claim 1, wherein said tongue-shaped arms include outwardly facing grooves in releasable engagement with the retaining wall.

3. A coupling as in claim 1, wherein the flange of said insert includes an annular rearwardly directing projection spaced from a cylindrical portion of said insert and dimensioned to surround the outer circumferential surface of the tube adjacent the end of the tube.

4. A coupling as in claim 1, wherein said small diameter chamber is of stepped configuration, and defines a minor diameter portion adjacent said communication hole, and a major diameter portion adjacent said large diameter chamber, said step being intermediate said minor diameter portion and said communication hole, said minor diameter portion defining a diameter substantially equal to the outside diameter of the tube.

5. A coupling as in claim 1, wherein the flange of the insert defines a diameter substantially equal to the diameter defined by said small diameter chamber adjacent said step.

* * * * *